(12) United States Patent
Otte et al.

(10) Patent No.: US 8,973,836 B2
(45) Date of Patent: Mar. 10, 2015

(54) METHOD FOR PERSONALIZING A PORTABLE DATA CARRIER, IN PARTICULAR A CHIP CARD

(75) Inventors: Günter Otte, München (DE); Nils Gerhardt, München (DE)

(73) Assignee: Giesecke & Devrient GmbH, Munich (DE)

( * ) Notice: Subject to any disclaimer, the term of this patent is extended or adjusted under 35 U.S.C. 154(b) by 5 days.

(21) Appl. No.: 13/696,002

(22) PCT Filed: May 3, 2011

(86) PCT No.: PCT/EP2011/002199
§ 371 (c)(1),
(2), (4) Date: Jan. 9, 2013

(87) PCT Pub. No.: WO2011/138009
PCT Pub. Date: Nov. 10, 2011

(65) Prior Publication Data
US 2013/0105574 A1   May 2, 2013

(30) Foreign Application Priority Data
May 4, 2010   (DE) .......................... 10 2010 019 195

(51) Int. Cl.
G06K 19/06 (2006.01)
G06F 17/00 (2006.01)
G06Q 20/34 (2012.01)
G07F 7/10 (2006.01)

(52) U.S. Cl.
CPC .............. *G06F 17/00* (2013.01); *G06Q 20/355* (2013.01); *G07F 7/1008* (2013.01)
USPC .......................................... 235/492; 235/380

(58) Field of Classification Search
USPC ................................. 235/380, 492
See application file for complete search history.

(56) References Cited

U.S. PATENT DOCUMENTS

| | | | |
|---|---|---|---|
| 4,855,578 A | 8/1989 | Hirokawa et al. |
| 5,534,857 A | 7/1996 | Laing et al. |
| 5,745,571 A | 4/1998 | Zuk |
| 5,959,276 A | 9/1999 | Iijima |
| 6,335,799 B1 | 1/2002 | Provost |

(Continued)

FOREIGN PATENT DOCUMENTS

| | | |
|---|---|---|
| EP | 0311417 A2 | 4/1989 |
| EP | 1 023 703 B1 | 8/2000 |

(Continued)

OTHER PUBLICATIONS

Rankl et al.; "Smart Card Handbook" 4th edition, pp. 201-203, 378-384 and 619-624, The Netherlands (2010).

(Continued)

*Primary Examiner* — Kristy A Haupt
(74) *Attorney, Agent, or Firm* — Workman Nydegger

(57) ABSTRACT

A method for personalizing a portable data carrier having a chip provided in a body of the portable data carrier. A portable data carrier whose chip contains data for personalizing the body of the portable data carrier is provided to a personalization unit. The personalization unit receives the data for personalizing the body of the portable data carrier from the chip of the supplied portable data carrier, and personalizes the body on the basis of the received data.

13 Claims, 2 Drawing Sheets

(56) References Cited

U.S. PATENT DOCUMENTS

| | | | |
|---|---|---|---|
| 6,402,028 B1 | 6/2002 | Graham, Jr. et al. | |
| 2008/0116261 A1 | 5/2008 | Gebhardt et al. | |

FOREIGN PATENT DOCUMENTS

| | | |
|---|---|---|
| EP | 1 260 944 A2 | 11/2002 |
| EP | 1 338 996 A1 | 8/2003 |
| EP | 1 376 492 A1 | 1/2004 |
| WO | 93/07697 A1 | 4/1993 |
| WO | 01/53915 A1 | 7/2001 |
| WO | 01/57789 A1 | 8/2001 |
| WO | 2007/087432 A2 | 8/2007 |

OTHER PUBLICATIONS

International Preliminary Report on Patentability and Written Opinion for PCT/EP2011/002199, Nov. 6, 2012 (7 pages).

International Search Report in PCT/EP2011/002199, Jul. 4, 2011 (4 pages).

METHOD FOR PERSONALIZING A PORTABLE DATA CARRIER, IN PARTICULAR A CHIP CARD

BACKGROUND OF THE INVENTION

A. Field of the Invention

The invention relates to a method for personalizing a portable data carrier, in particular a chip card, as well as to a personalization unit or personalization station employable in the method and to a corresponding portable data carrier.

B. Related Art

The invention is in the field of the manufacture of portable data carriers comprising a chip in the form of an integrated circuit which is provided in a body of the portable data carrier. A portable data carrier can relate here to arbitrary kinds of storage media, such as e.g. USB sticks. In a preferred embodiment, the data carrier is a chip card (e.g. a smart card), wherein the chip of the chip card can be configured as a memory chip or as a processor chip with a corresponding microprocessor. In data carriers not configured as chip cards, the body of the data carrier is formed in particular by its housing. In contrast, the body of the data carrier in chip cards is the card body of the card in which body the chip is integrated. This card body is normally made of plastic.

Portable data carriers are frequently manufactured individually for a person or institution, so that it is necessary that the data carrier is personalized for the corresponding person or institution. Personalization is to be understood here as the depositing or applying of information which is associated individually with a single person/institution or a single data carrier to the chip or the body of the data carrier. This information can comprise for example the name and address of the (future) card owner or card-related keys. One distinguishes in this connection between optical and electrical personalization. In optical personalization, the information applied on the body of the portable data carrier is optically visible to a user or can be made visible via corresponding means (such as e.g. lenses). In electrical personalization, electrically readable information is deposited on the portable data carrier, in particular on the chip of the portable data carrier or, where applicable, on other storage media of the portable data carrier, such as e.g. a magnetic stripe.

As a rule, the personalization of a portable data carrier is carried out by a personalization unit which obtains the personalization data to be applied to the respective data carrier from a service provider or the issuer of the data carrier. The data must in so doing regularly be transmitted from the service provider or card issuer to the personalization unit at least partly via public networks. Because the personalization data involve highly sensitive personal information, suitable cryptographic encryption methods are employed upon the transmission of these data. This has the disadvantage that corresponding encryption mechanisms must be made available, and there must be provided in the personalization unit a security module for decrypting the transferred data.

In the document U.S. Pat. No. 6,335,799 B1 there is described a method for the immediate issuance of personalized cards to a user, wherein person-specific information of the card user is imprinted on the card via a printer on site. The cards employed in this method have no IC chip.

In the document EP 1 023 703 B1 there is described a method for electrically personalizing a smart card, wherein personalization data are transferred from the card issuer to a personalization place in the form of a file. The transfer of the file is effected e.g. via a floppy disk or a secure network connection. At the personalization place the personalization of the smart card is subsequently performed on the basis of the transferred file.

In the document U.S. Pat. No. 5,534,857 there is described a further method for personalizing a smart card, wherein the card is personalized by a retailer on site and subsequently issued to a customer. Within the framework of the personalization, information is exchanged between a computer of the card issuer and terminal devices of the retailer via cryptographically secured data connections.

The object of the invention is to make it possible to personalize a portable data carrier on the basis of a simple infrastructure.

SUMMARY OF THE INVENTION

The method according to the invention serves for personalizing a portable data carrier and in particular a chip card, the data carrier being equipped with a chip provided in a body of the portable data carrier. For personalization, in a step a) there is supplied to a personalization unit a portable data carrier whose chip contains data for personalizing the portable data carrier. Data for personalizing the body of the portable data carrier are to be understood here and hereinafter to be personalization data that are to be applied or to be deposited on the body of the portable data carrier. That is to say, these personalization data do not relate to those personalization data with which the chip of the portable data carrier is personalized. In particular, data for personalizing the portable data carrier are to be understood to be optical personalization data that are to be applied on the data-carrier body so as to be optically visible. Where applicable, the data for personalizing the body of the portable data carrier can also comprise data for a magnetic stripe provided on the body of the portable data carrier, which are to be deposited in this magnetic stripe.

In step c) of the method according to the invention, the personalization unit receives the data for personalizing the body of the portable data carrier from the chip of the data carrier supplied in step a), and personalizes the body on the basis of the received data. The reception of the personalization data is effected in particular via a corresponding interface between chip and personalization unit, whereby the data can be read out via the interface e.g. by the personalization unit. Likewise, the data can be requested from the personalization unit via the interface, whereupon the data are transferred from the chip to the personalization unit.

The method according to the invention is characterized in that the data required for personalizing the body of the portable data carrier are already deposited in the chip of the portable data carrier in advance, so that an encrypted transfer of these data to the personalization unit is no longer required. In particular, one can dispense with employing a corresponding security module in the personalization unit for decrypting the transmitted encrypted data. In this way the infrastructure is simplified upon the carrying out of the personalization.

In a preferred variant of the method according to the invention, the chip of the supplied portable data carrier does not only contain data for personalizing the data-carrier body. Rather, the chip of the portable data carrier also comprises personalization data with which the chip is electrically personalized. In this way there is obtained after the completion of personalization a portable data carrier wherein the body of the portable data carrier as well as its chip are personalized with card-specific data in suitable fashion.

In a particularly preferred variant of the method according to the invention, within the framework of step a) the data for personalizing the body of the portable data carrier are transferred to the chip of the portable data carrier at a personalization place configured separately from the personalization unit, and the portable data carrier subsequently delivered to the personalization unit. According to this variant, the infrastructure for personalization can be configured especially flexibly, because the personalization place which carries out a suitable prepersonalization of the portable data carrier by depositing data for personalizing the data-carrier body on the data-carrier chip can be arranged at an arbitrary place spatially separated from the personalization unit for carrying out the personalization of the data-carrier body. No encrypted transfer of data for personalizing the body of the portable data carrier via public networks is required in this variant either. It must only be ensured that the prepersonalized portable data carriers are delivered from the remote personalization place to the personalization unit in suitable fashion, it being readily possible to use, inter alia, logistic service enterprises for this purpose. For improving the security, the data for personalizing the body can be stored in the chip of the data carrier in encrypted form.

In a particularly preferred variant of the embodiment just described, the data for personalizing the body of the portable data carrier are transferred to the chip of the portable data carrier in encrypted form at the personalization place, the encrypted data being decrypted by the chip. For decryption there are employed in particular one or several card-individual keys. For realizing this variant of the invention there is preferably deposited on the chip of the portable data carrier an application or an applet with which the decryption of the encrypted data is carried out. The decrypted data are, in so doing, made available on the data carrier in the form of one or several data elements, in particular in the form of a file, which is transmitted to the personalization unit upon the carrying out of the personalization.

In a further, preferred variant of the method according to the invention, an on-site personalization of the portable data carrier is made possible by the portable data carrier being supplied to a personalization unit which is arranged at an issuance place for issuing the portable data carrier to users. For example, this issuance place can be the branch of a bank at which a portable data carrier is issued to customers in the form of a bank card or credit card.

In a further variant of the method according to the invention, the personalization unit receives from the chip of the portable data carrier in step c) of the method first all the data for personalizing the body of the portable data carrier, for example by reading out or requesting one or several files in which the data are deposited. Only after receiving all the data the personalization unit then carries out the personalization of the body of the portable data carrier, the personalization being effected in particular through control commands deposited in the personalization unit. That is to say, in this variant the personalization is carried out through the personalization unit in self-acting fashion, without employing corresponding information on the chip of the portable data carrier.

In an alternative or additional variant of the method according to the invention, it is also possible that the personalization unit receives from the chip of the portable data carrier in step c) of the method, besides the data for personalizing the body of the portable data carrier, one or several control commands by means of which the personalization unit is controlled upon the carrying out of the personalization. This variant of the invention can be realized in particular by a corresponding application or an applet on the chip of the portable data carrier. This embodiment has the advantage that the control of the personalization carried out by the personalization unit is effected via corresponding commands or instructions on the portable data carrier, thereby making it possible to adapt the personalization method flexibly to the requirements of the respective portable data carrier.

In a particularly preferred variant of the embodiment just described, the control commands are received in the personalization unit stepwise, whereby after the reception of one control command the execution of the control command in the personalization unit is first initiated and subsequently the next control command is received.

In a further variant of the method according to the invention, the actual carrying out of the personalization by the personalization unit can be preceded by a suitable authentication with which the authorization of the personalization unit for carrying out the personalization of the supplied portable data carrier is checked. The personalization is then started only upon successful authentication.

As mentioned above, the personalization unit preferably receives the data for personalizing the data-carrier body from the chip of the portable data carrier via an interface between chip and personalization unit. This interface can be of contactless or contact-type configuration. In a particularly preferred variant, a USB interface is employed. That is to say, the portable data carrier has a corresponding USB terminal for data exchange.

In a further embodiment of the method according to the invention, the personalization in step c) is carried out by a personalization unit which comprises several personalization stations, whereby preferably in each personalization station a different kind of personalization is performed or different personalization data applied on the portable data carrier. One personalization station here can be e.g. a high-embossing station for embossing characters on the data-carrier body, and another personalization station can be a station for applying a laser engraving or for imprinting pictures.

Besides the above-described method, the invention further comprises a personalization unit to be employed in this method, the personalization unit being configured such that during operation it receives data for personalizing the body of the portable data carrier from the chip of the portable data carrier, and personalizes the body on the basis of the received personalization data.

Furthermore, the invention relates to a personalization station which serves for preparing the data carrier supplied in step a) in the method according to the invention. This personalization station, which is preferably arranged remotely from the above-described personalization unit, is characterized in that during operation it transfers data for personalizing the body of a respective portable data carrier to the chip of the portable data carrier.

The invention furthermore relates to a portable data carrier, in particular a chip card, which is supplied in step a) in the method according to the invention. This data carrier is characterized in that its chip contains data for personalizing the body of the portable data carrier.

DESCRIPTION OF THE DRAWINGS

Embodiment examples of the invention will hereinafter be described in detail with reference to the attached figures.

There are shown.

The hereinafter described embodiments of the method according to the invention will be explained with regard to the personalization of a portable data carrier in the form of a chip card, which is designated by reference sign 1 in FIG. 1. However, the invention is also employable with the same advantages for data carriers in other configurations, for instance for data carriers in watch form or in the form of a writing utensil.

Figure 1:
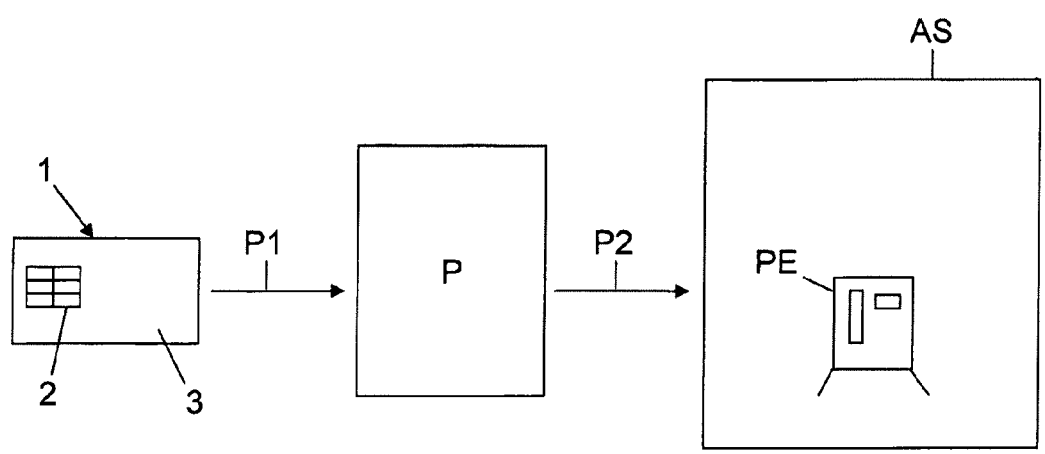
FIG. 1 a schematic representation of components involved in personalization in one embodiment of the method according to the invention.

The chip card according to FIG. 1 comprises an IC chip 2 which is integrated in a card body 3 of the chip card 1. The aim of the here described variant of the method according to the invention is to apply on the card body 3 of the chip card 1 individual personalization information valid only for this chip card, e.g. person-specific information of the later user of the chip card. This personalization information comprises in particular data to be imprinted or embossed on the card body, such as e.g. the name of the later card owner or a picture of the card owner. This personalization information will hereinafter also be designated as outer personalization data. Where applicable, these personalization data can also comprise data for the magnetic stripe of the chip card 1, if such a magnetic stripe is provided on the card. These data are then deposited in the magnetic stripe on the body 3. Furthermore, outer personalization data can comprise for example so-called CVV (Card Verification Value)/CVC (Card Validation Code) codes which are employed in particular in credit cards and constitute a further security feature for verifying the credit card. Such a code is in particular a multi-figure check digit which is imprinted on the credit card in addition to the card number.

According to the representation of FIG. 1, a chip card 1 not yet personalized is first delivered to a personalization place P, which is indicated by the arrow P1. This personalization place may be for example a central personalizer of a bank or a local personalization place arranged in decentralized fashion, e.g. in a bank branch, which is provided for electrically personalizing only the chip 2 and not the card body 3 of corresponding chip cards 1, in particular in the form of bank cards (e.g. EC cards) or credit cards.

After the prepersonalization of the chip cards at the personalization place P, they are delivered to an issuance place AS. The issuance place AS may be for example a branch of a bank that is spatially separate from the personalization place and later issues the cards to customers. However, personalization place P and issuance place AS can also be arranged in the immediate vicinity of each other or be realized in a common facility, so that a transport of chip cards 1 between personalization place P and issuance place AS can be effected e.g. via a transport band.

At the issuance place AS there is provided a personalization machine or personalization unit PE which personalizes the card body 3 of the delivered chip card 1 by means of outer personalization data. That is to say, the personalization unit PE carries out corresponding operations with which card-specific data are embossed into the card or imprinted thereon. The delivery of the chip card from the central personalization place P to an issuance place AS is indicated in FIG. 1 by the arrow P2. The delivery corresponds here to a transport of the chip card 1 from the personalization place P to the issuance place AS. The transport can be effected in the case of spatial separation through logistic service providers, for instance by post, or in the case of spatial proximity e.g. via transport bands.

As will be explained more closely below with reference to FIG. 2, the method according to the invention is characterized in that at the central personalization place P there are applied to the chip 2 of the chip card 1 not only the data for personalizing the chip, but also the later employed outer personalization data for personalizing the card body. This avoids the disadvantage known from the prior art that the corresponding outer personalization data must be transmitted to the issuance place AS on a separate, cryptographically secured communication path. Therefore, one can dispense with a corresponding security module in the personalization unit PE for decrypting the cryptographically transferred outer personalization data, thereby making it possible for the personalization unit to have a simpler configuration.

Figure 2:
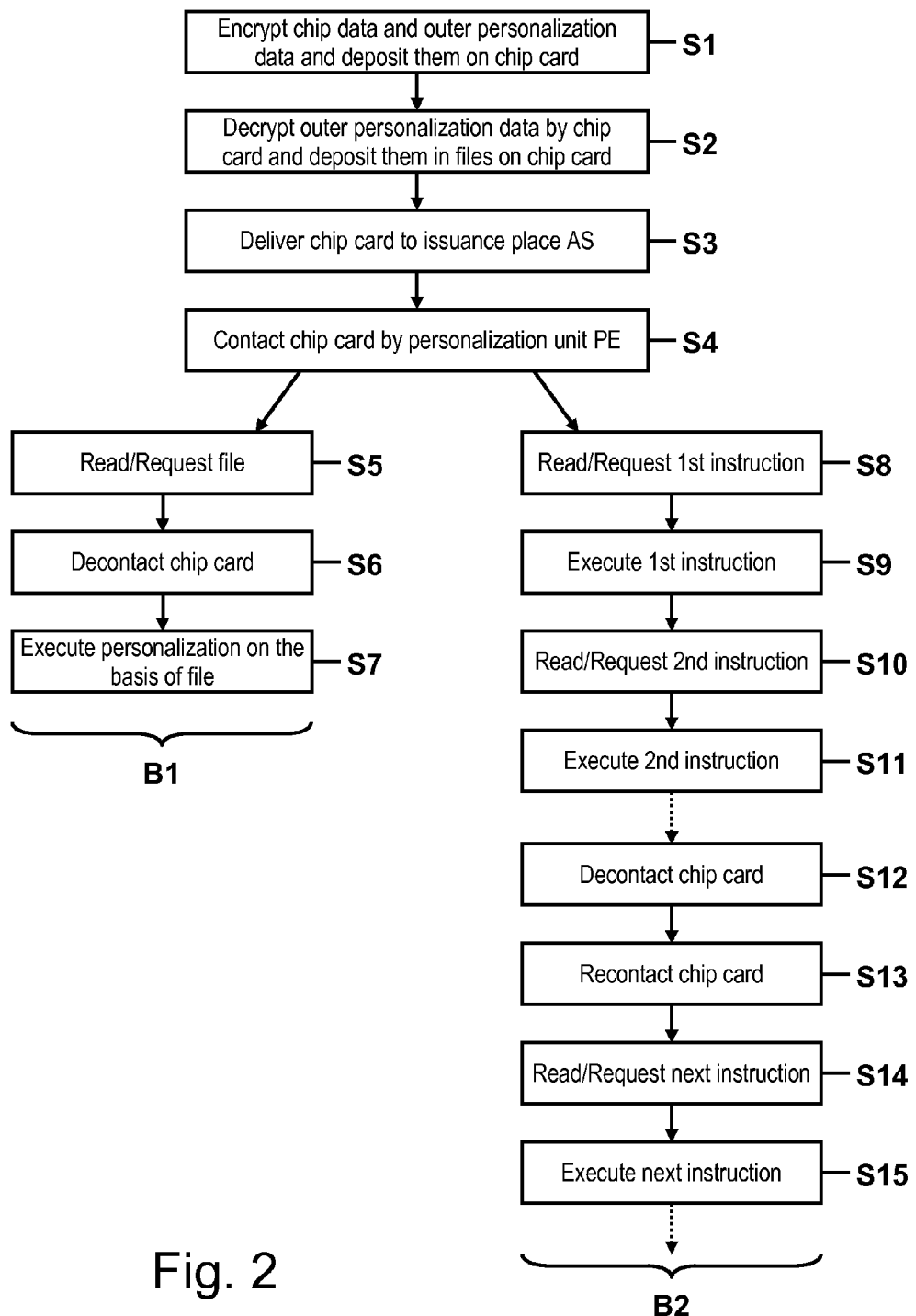
FIG. 2 a flowchart clarifying two variants of the personalization method according to the invention employing the components of FIG. 1.

FIG. 2 shows a flowchart clarifying two variants of a personalization method according to the invention which are carried out on the basis of the infrastructure shown in FIG. 1. One variant of the method is rendered by the branch B1, and the other variant by the branch B2, with the steps S1 to S4 before the two branches being substantially identical for both variants. The steps S1 and S2 of the method of FIG. 2 are carried out at the personalization place P. The step S3 represents the delivery of the chip card 1 to a decentralized issuance place AS. The remaining steps S5 to S15 relate to processes carried out at the issuance place AS.

In step S1 of the method of FIG. 2, chip data with which the chip 2 of the chip card 1 is personalized as well as the above-described outer personalization data for personalizing the card body 3 of the chip card 1 are encrypted and deposited on the chip of the chip card. The transfer of these data to the chip card 1 is effected at the personalization place P, as mentioned above, there being employed for this purpose a suitable interface between the chip of the chip card 1 and a corresponding computing unit at the personalization place P, such as e.g. a USB interface. On the chip of the chip card there is located an application or an applet which subsequently decrypts the outer personalization data transferred in encrypted form and supplies them in the form of files and/or data fields, as indicated by the step S2 in FIG. 2.

The chip card is subsequently delivered to an issuance place AS, as rendered in FIG. 2 by the step S3. At the issuance place AS there is located the personalization unit PE which subsequently personalizes the chip card 1 on the basis of the outer personalization data which are deposited in the file generated on the chip 2. For this purpose the chip card is contacted by the personalization unit or personalization machine PE according to step S4 to read out data from the file or request them therefrom. The contacting can be effected on the above-described USB interface again.

In the variant according to the branch B1, the chip card 1 is contacted by a contacting unit of the personalization machine only once, while, in the variant according to the branch B2, the personalization machine comprises several personalization stations with separate contacting units for contacting the chip card, so that, in the variant according to the branch B2, the step S4 represents the contacting of the chip card by the contacting unit of the first personalization station. In the embodiment according to the branch B1, the file with the outer personalization data is read out from the card or requested from the card by the personalization unit PE, and transferred thereto, en bloc (step S5). In the optional step S6, the chip card can then be decontacted again, but the contact between chip card and personalization unit can also be maintained, where applicable.

Finally, in step S7, the personalization is carried out through the personalization unit PE independently on the basis of the outer personalization data contained in the file. Where applicable, the personalization unit here can also comprise several personalization stations (without separate contacting units), with a corresponding step of personalizing the card body 3 of the chip card 1 being performed in each personalization station. In particular, there can be provided in the personalization unit a high-embossing station for embossing card-specific or user-specific data, as well as further optical personalization stations with which e.g. laser engravings are applied or further information imprinted on the card body, such as e.g. a picture of the later card owner. After completion of the personalization of the card body by the personalization unit PE at the issuance place AS, the card can finally be delivered to the customer for whom the card was manufactured.

In contrast to the variant B1, in which personalization is carried out through the personalization unit PE in self-acting fashion, in the variant according to the branch B2 the chip card 1 acts as a personalization master which controls the personalization carried out by the personalization unit PE, via corresponding control commands to the personalization unit. This variant has the advantage of reducing the required computing power for carrying out the personalization on the part of the issuance place AS, and further of increasing the security and flexibility of the method, because the control of the personalization is taken over by the chip card itself. For implementing the variant according to the branch B2, the above-mentioned control commands are deposited, besides the outer personalization data, in the file generated in step S2, i.e. the control of the personalization is already fixed at the personalization place P upon the generation of the file.

After the first contacting of the chip card according to step S4, in the variant according to the branch B2, a first instruction is read out or requested from the file with the outer personalization data accordingly necessary for the instruction by the first personalization station of the personalization unit PE (step S8). Subsequently, the first instruction is executed (step S9). This instruction can comprise for example the process of embossing card-specific data by the first personalization station in the form of a high-embossing station. Subsequently, further instructions can be read in via the contacting unit of the first personalization station. These instructions can relate e.g. to the embossing of further information which is to be applied at another place on the card body of the chip card than the information previously embossed according to the first instruction. These further instructions are finally executed in the personalization unit. The reading in and executing of further instructions is indicated in FIG. 2 by way of example on the basis of a second instruction by steps S10 and S11. Where applicable, the second instruction is followed by additional instructions, which is indicated by a dotted arrow between steps S11 and S12 in FIG. 2. It can be provided that the chip card 1 is respectively decontacted and recontacted again between the individual instructions or after the execution of certain instructions.

After the processing of all instructions for the first personalization station, the chip card is decontacted (step S12) and transported to a second personalization station, or another processing unit in the same station is switched on. In the second personalization station or by the second processing unit the chip card is recontacted via a suitable contacting unit (step S13). Subsequently, analogously to the first personalization station, corresponding instructions are read out or requested again with the suitable outer personalization data by the second personalization station, the instruction just read out being executed immediately. This is indicated in FIG. 2 by the steps S14 and S15. The second personalization station can be for example a station for applying or imprinting a picture on the chip card. The method can continue in suitable fashion by the requesting or reading out and executing of further instructions by the second personalization station and further personalization stations, where applicable, until all the personalization data in the file on the chip of the chip card are processed and the personalization is completed. The continuation of the method is indicated in FIG. 2 by a dotted arrow below the step S15.

In both of the above-described variants according to the branches B1 and B2 of FIG. 2, the personalization of the card body 3 of the chip card 1 is effected on the basis of information from a file which was deposited in advance in the chip of the chip card. In so doing, information is requested or read out from the file by the personalization unit PE. There is in both variants also the possibility, where applicable, that acknowledgments are given back to the just contacted chip card by the personalization unit PE. For example, it can be acknowledged to the chip card after the execution of an instruction according to the branch B2 that the corresponding instruction was correctly executed. It can further be provided that a chip card 1 reacts to such acknowledgments dynamically, e.g. controlling the progress of the further processing.

The above-described embodiments of the method according to the invention have a number of advantages. In particular, an on-site personalization of the card body of chip cards can be performed at the site of issuance of the chip cards without the required personalization data having to be transferred via a separate cryptographic data connection. This increases the security of the method. Furthermore, there need no longer be provided in the personalization unit of the corresponding issuance station a security module to decrypt the data transmitted via a data connection in encrypted form. Therefore, the technical requirements for the personalization unit are lower compared with conventional methods. Furthermore, in a special variant there is the possibility that the personalization is controlled by corresponding commands on the chip card itself, thereby making the method flexible with respect to the carrying out of the personalization and requiring less computing power in the personalization unit.

The invention claimed is:

1. A method for personalizing a portable data carrier, the portable data carrier having a body with a chip positioned therein, the method comprising:
 a) transferring to the chip, at a personalization place, data for personalizing the body of the portable data carrier said data comprising optical personalization data configured to be applied to the body so as to be optically visible;
 b) transporting the portable data carrier to a personalization unit, the personalization unit being configured separately from the personalization place;
 c) receiving from the chip, by the personalization unit:
  one or more control commands, and
  the data for personalizing the body of the portable data carrier; and
 d) personalizing the body of the portable data carrier on the basis of the data received by the personalization unit from the chip, comprising executing the one or more control commands received by the personalization unit from the chip.

2. The method according to claim 1, further comprising transferring to the chip personalization data with which the chip is electrically personalized.

3. The method according to claim 1, wherein the data for personalizing the body of the portable data carrier are transferred to the chip of the portable data carrier in encrypted form, the encrypted data being decrypted by the chip.

4. The method according to claim 1, wherein the control commands are received by the personalization unit from the chip stepwise, whereby after the reception of one control command from the chip, the execution of the control command by the personalization unit is first initiated and subsequently the next control command is received.

5. The method according to claim 1, wherein the personalization of the body of the portable data carrier is carried out in step d by a personalization unit which comprises several personalization stations.

6. A personalization unit for use in carrying out the method recited in claim 1, wherein the personalization unit is configured such that during operation the personalization unit receives the one or more control commands and the data for personalizing the body of the portable data carrier from the chip of the portable data carrier, and personalizes the body on the basis of the received control commands and personalization data.

7. A personalization station for preparing portable data carriers to be used in the method according to claim 1, wherein the personalization is configured such that during operation the personalization station transfers the one or more control commands and the data for personalizing the body of a respective portable data carrier to the chip of the portable data carrier.

8. The method recited in claim 1, wherein the chip remains positioned within the body of the portable data carrier as the data is transferred to the chip at the personalization place in step a and as the control commands and data are received from the chip by the personalization unit in step c.

9. The method recited in claim 1, wherein the chip remains positioned within the body of the portable data carrier as steps a-d are performed.

10. The method recited in claim 1, wherein personalizing the body of the portable data carrier in step d is accomplished by applying the optical personalization data to the body of the portable data carrier so as to be optically visible.

11. The method recited in claim 1, wherein step a further comprises transferring to the chip, at the personalization place, the one or more control commands.

12. The method recited in claim 11, wherein the chip remains positioned within the body of the portable data carrier as the control commands and data are transferred to the chip at the personalization place in step a and as the control commands and data are received from the chip by the personalization unit in step c.

13. A portable data carrier comprising a body and a chip positioned within the body, wherein the chip contains one or more control commands and data for personalizing the body of the portable data carrier, the data comprising optical personalization data configured to be applied to the body so as to be optically visible.

* * * * *